United States Patent [19]

Dillenburg et al.

[11] 3,914,380
[45] Oct. 21, 1975

[54] PROCESS FOR THE PRODUCTION OF PARTICLES OF SODIUM PERBORATE MONOHYDRATE HAVING AN INCREASE RESISTANCE TO ABRASION

[75] Inventors: Helmut Dillenburg, Bad Honningen; Helmut Honig, Eurasburg uber Wolfratshausen; Paul-Wilhelm Fuchs, Bad Honningen, all of Germany

[73] Assignee: Peroxid-Chemie GmbH, Hannover, Germany

[22] Filed: Nov. 27, 1973

[21] Appl. No.: 419,257

[30] Foreign Application Priority Data
Nov. 29, 1972 Germany.............................. 2258319

[52] U.S. Cl. ................................................ 423/279
[51] Int. Cl.² ........................................ C01B 15/12
[58] Field of Search ...................................... 423/279

[56] References Cited
UNITED STATES PATENTS

| | | | |
|---|---|---|---|
| 2,032,388 | 3/1936 | Allen | 423/279 |
| 3,421,842 | 1/1969 | Darbee et al. | 423/279 |
| 3,700,414 | 10/1972 | Dillenburg et al. | 423/279 X |

FOREIGN PATENTS OR APPLICATIONS

| 2,040,507 | 2/1972 | Germany | 423/279 |
|---|---|---|---|

*Primary Examiner*—G. O. Peters
*Attorney, Agent, or Firm*—Michael S. Striker

[57] ABSTRACT

A process for the production of sodium perborate monohydrate having an increased resistance to abrasion wherein sodium perborate tetrahydrate is treated with hot air having a relative humidity between 40 and 80%. The temperature of the moist air discharged from the dryer is maintained between 60° and 90°C.

5 Claims, No Drawings

PROCESS FOR THE PRODUCTION OF PARTICLES OF SODIUM PERBORATE MONOHYDRATE HAVING AN INCREASE RESISTANCE TO ABRASION

BACKGROUND OF THE INVENTION

Sodium perborate monohydrate is being used increasingly as a detergent and cleansing agent and is frequently substituted for sodium perborate tetrahydrate as a source of available oxygen. It is usually produced by controlled dehydration of the tetrahydrate in a fluidized bed dryer, that is often referred to as a pneumatic conveying dryer, or in a so-called vibrating or shaking-screen dryer. The available oxygen content of sodium perborate monohydrate is approximately 50% greater than that of the tetrahydrate and its rate of solution is also greater than that of the tetrahydrate. However, the monohydrate is considerably less resistant to abrasion than the tetrahydrate and, as a consequence, a larger amount of dust and powder is produced during its manufacture and, since it contains available oxygen, it represents a hazard which it would be desirable to avoid. The low abrasion resistance of the monohydrate is attributed to the disruption of the crystal lattice by removal of three molecules of water of crystallization, as a result of which the crystals become porous and less resistant to abrasion than the tetrahydrate from which it was produced.

Many attempts have heretofore been made to increase the resistance of sodium perborate monohydrate particles to abrasion. In published German accepted Pat. application No. 2,040,507, a process is described in which the resistance to abrasion of the monohydrate is stated to be increased by moistening the monohydrate with between 15 and 20 % by weight of water at a temperature between 20° and 90°C, and subsequently drying the moistened product at a temperature between 40° and 90°C. Such a process requires suitable equipment for moistening the monohydrate and subsequently drying it, as well as equipment for dehydrating the tetrahydrate crystals to monohydrate. Despite the higher cost of operating such a process, the resistance to abrasion that is achieved is unsatisfactory, as indicated in the following table of results of two different abrasion tests that were performed on three different materials. These materials were the following:

A. Sodium perborate tetrahydrate crystals having a bulk density of 0.75 kilogram per liter.

B. Sodium perborate monohydrate produced in accordance with a conventional dehydration process.

C. Various samples of sodium perborate monohydrate produced by moistening and dehydration of the foregoing product B in accordance with the process described in published German accepted Patent application No. 2,040,507.

|  | A | B | C |
|---|---|---|---|
| Test 1 | 5 % | — | 9 to 13 % |
| Test 2 | 4 % | 43 % | 8 to 11 % |

The percentages that are referred to in the table represent the percentages by weight of the original sieved particles of perborate that were abraded or disintegrated to powder, the particles of which had a smaller specified size, after being subjected to the test specified. The percentage of product B that was abraded in Test 1 could not be measured because the abraded material was too fine.

In Test 1, 50 grams of the perborate which had previously been classified by sieving so that all particles had a size larger than 0,2 millimeter was placed in a cylindrical ball mill that was half-filled with lead beads having a diameter of 5 millimeters. The mill was then rotated for 15 minutes at a rate of 145 revolutions per minute, and the perborate was then sieved again on a sieve the diameter of the openings of which was 0.053 millimeter, such as a No. 270 American Standard Sieve having 270 meshes per inch. The powder that passed through the sieve was then weighed and its weight was converted to percentage by weight of the original 50 grams.

Test 2 was performed as described in published German accepted Patent application No. 2,040,507, as follows: 50g of the product were classified on a shaking sieve for 5 minutes. Thereafter each fraction was sieved separately in the presence of three rubber cubes of a weight of 9g each for 10 minutes. The increase of the sieve fraction below 0,2 mm was designated as "dust."

The results reported in the foregoing table indicate that the resistance of the monohydrate to abrasion is always lower than that of the tetrahydrate. But only when the resistance of the monohydrate is equal to that of tetrahydrate crystals in such tests, can it be expected that the monohydrate can be conveyed pneumatically without the formation of substantial quantities of dust.

In another process that is described in published German application Patent No. 1,930,286, the resistance to abrasion of sodium perborate monohydrate produced from the tetrahydrate is increased if the tetrahydrate is dehydrated in a fluidized bed dryer to which air at a temperature between 180° and 210°C is supplied and the temperature of the discharged air at the outlet of the dryer is between 56.7° and 58.6°C. Although the resistance of the particles to abrasion is thereby increased, the use of such high temperatures involves the expenditure of large quantities of thermal energy. Furthermore at such temperatures, which are substantially higher than the melting and decomposition points of sodium perborate hydrates, some of the available oxygen of the compound may be lost.

During the continuous dehydration of sodium perborate tetrahydrate in the fluidized state at temperatures of the supplied air between 140° and 160°C according to a known process the relative humidity adopts automatically a value of 30 %; the temperature of the exhaust air being about 55°C. The sodium perborate tetrahydrate does not melt and consequently sintering, which would affect the hardness of the particles, cannot occur since the temperature of the exhaust air is lower than the melting point of the sodium perborate tetrahydrate. Even if the temperature of the discharged air is increased substantially, the sodium perborate tetrahydrate cannot melt since the heat is consumed in the expulsion of the water of crystallization from the tetrahydrate maintaining a high rate of evaporation of the water.

SUMMARY OF THE INVENTION

In the process of the present invention, crystals of sodium perborate tetrahydrate are dehydrated to sodium perborate monohydrate particles that have an increased resistance to abrasion and a high rate of solution without loss of available oxygen, by maintaining in the heated air surrounding the crystal grains a relative humidity between 40 and 80 %, preferably between 50 and 70 %, and maintaining the temperature of the discharged air at least at 60°C preferably between 60° and 90°C. Under these conditions, the sodium perborate tetrahydrate particle is slightly melted during the expulsion of the water of crystallization therefrom i.e. the water of crystallization is drawn from thin molten layers and, when cooled, the perborate solidifies to produce a solid compact grain.

Because of the higher relative humidity of the supplied air, the rate of evaporation of the water of crystallization in the process of this invention is slower than in the process disclosed in German published application No. 1,930,286, so that a portion of the heat that is supplied is used for melting the particles partially. The temperature of the discharged air must accordingly be higher than the melting point of sodium perborate tetrahydrate, which is 60°C.

It was also found that the specified high relative humidity need not be maintained during the entire dehydration process. To achieve the desired abrasion resistance it is sufficient to maintain such high relative humidity only during the removal of at least 0.8 and preferably at least 1 molecule of water of crystallization from each molecule of the tetrahydrate. The residual water of crystallization can be expelled under usual conditions with air having a lower relative humidity. The process is preferably started under usual conditions with air having a low relative humidity-definitely under 40 %-as described in the prior art and is continued until water equivalent to approximately 1.5 – 2.5 molecules of water of crystallization for each molecule of sodium perborate are expelled. Then the conditions of the invention are created i.e. the relative humidity of the supplied air is increased and the dehydration is continued with air having a relative humidity between 40 and 80% so that the temperature of the discharged air is preferably kept between 70° and 90°C. If, on the other hand, the entire process is carried out with air having a high relative humidity, the temperature of the discharged air should be lower, that is between 60° and 65°C, at least at the beginning of the process.

The temperature of the heated air that is introduced into the dryer is not critical and is generally determined by the temperature of the air discharged from the dryer, which is preselected in accordance with the consideration referred to hereinbefore. The incoming air will generally have a temperature between 70° and 130°C.

The particles of sodium perborate monohydrate that are produced in accordance with the process of the present invention are more resistant to abrasion than monohydrate that was heretofore produced by dehydration of sodium perborate tetrahydrate crystals; they have a high rate of dissolution and contain more than 15% by weight of available oxygen.

The process of the present invention is distinguished by its great simplicity. It can be performed in a continuous or discontinuous manner in conventional apparatus such as fluidized bed dryers, vibrating dryers, or vertical streamdryers, or combinations of these. The moistening of the air to obtain a preselected relative humidity may be effected by metering steam into the air as it is being charged into the dryer. However, the most suitable dehydration devices are those which make it possible to introduce steam into a continuous stream of air or to recycle the exhaust air leaving the dryer.

The invention is further described and illustrated in the detailed description which follows:

DETAILED DESCRIPTION

The Examples which follow are preferred embodiments of the invention which were selected solely for purposes of illustration and consequently are not to be regarded as restrictive of the invention or its scope.

EXAMPLE 1

Into a fluidized bed dryer which has a cross-sectional area of 2 square meters was placed 150 kilograms of sodium perborate tetrahydrate crystals that had been separated from the mother liquor in a centrifuge and which still had a residual moisture content of 5%. When dried thoroughly a sample of this sodium perborate tetrahydrate had a bulk density of 0.80 kilogram per liter and an abrasion value of 1.5% as determined in accordance with Test 1 that was described hereinbefore.

Into this dryer, air having a temperature of 85°C was charged at a rate of 8000 cubic meters per hour together with such an amount of saturated steam at a pressure of 1.4 atmospheres gauge (temperature approximately 126.5°C) that the temperature of the discharged air was 65°C and its relative humidity was 70%. After about 1 hour, 90 kilograms of sodium perborate monohydrate having an available oxygen content of 15.4% and a bulk density of 0.55 kilogram per liter were withdrawn from the dryer. From the filter elements of a cyclone through which the air was passed before being discharged from the dryer, an additional 10 kilograms of sodium perborate monohydrate powder was collected in the form of dust.

The sodium perborate monohydrate particles that were thus produced were classified on a vibrating screen, the openings of which were 0.9 millimeter in diameter.

Of this product, 85 kilograms of sodium perborate monohydrate particles having a size smaller than 0.9 millimeter were obtained. The abrasion value of this product was 3% as determined in accordance with Test 1 that was described hereinbefore.

EXAMPLE 2

Into a shaking-screen or vibrating dryer which had a length of 6 meters and a cross-sectional area of 3 square meters, that was composed of three individual air chambers, were continually charged the same centrifuge-damp sodium perborate tetrahydrate crystals that were used in Example 1 at the rate of 220 kilograms per hour. The crystals were passed successively into the first and discharged from the third air chamber of the dryer. Air of a temperature of 90°C was introduced into the first chamber of the dryer at a rate of 4000 cubic meters per hour. The temperature of the exhaust air was 55°C.

Air having a temperature of 90°C was charged into each of the second and third chambers of the dryer at a total rate of 7000 cubic meters per hour. Into these two air streams, however, saturated steam at a pressure of 1.4 atmospheres gauge (temperature approximately 126.5°C) was added at such rates that the air discharged from each of these chambers at a temperature of 80°C had a relative humidity of 70%. Dust was removed from the air emerging from the three chambers and the air was recycled to the air inlet fan.

A sample of the sodium perborate monohydrate after passing the first chamber had an available oxygen content of 13.5%, indicating that it still contained more than 1 molecule of water of crystallization.

At the outlet end of the dryer sodium perborate monohydrate having an available oxygen content of 15.4% and a bulk density of 0.55 kg/l was discharged at the rate of 125 kilograms per hour. In the air filters, 12 kilograms of the product in the form of dust was also collected each hour. The product was sieved as described in Example 1 and there was thus obtained 123 kilograms marketable product from each 125 kilograms of the monohydrate that was discharged each hour. This product had an abrasion value of 3%, as determined in accordance with Test 1 that was described hereinbefore, and it dissolved completely (100%) in one minute in accordance with the following test:

The rate of solution is determined by adding 2 grams of the product to 1 liter of distilled water having a temperature of 15°C and the dispersion is agitated to ensure that the particles are homogeneously distributed. Samples of the solution are then withdrawn at specified intervals and titrated to determine their content of available oxygen. The contents of available oxygen are plotted as a function of the time, from which graph the rate and the amount that has dissolved in any specified period can be determined.

This Example also demonstrates that, even if the specified relative humidity and air temperatures of the discharged air are maintained during the expulsion of only 1 molecule of water of crystallization particles are obtained which have a low abrasion value as determined in accordance with Test 1 that was described hereinbefore, and thus are highly resistant to abrasion.

Without further analysis, the foregoing will so fully reveal the gist of the present invention that ohers can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a process for the production of particles of sodium perborate monohydrate from sodium perborate tetrahydrate by continuously charging a stream of hot air through a drying chamber and into direct contact with particles of sodium perborate tetrahydrate that are disposed therein, the improvement whereby the particles are partially melted and their resistance to abrasion is improved, which process comprises maintaining the relative humidity of the hot air within the range between 40 and 80% and the temperature of the hot moist air leaving the drying chamber within the range between 60° and 90°C, the said temperture and relative humidity being maintained for a period sufficient to expel at least 0.8 molecule of water of crystallization per molecule of sodium perborate from the particles.

2. A process as defined in claim 1 in which the relative humidity of the air discharged from the drying chamber is maintained between 50 and 70%.

3. A process as defined in claim 1 in which the temperature of the air discharged from the chamber is maintained between 60° and 70°C.

4. A process as defined in claim 1 in which the relative humidity and temperature are maintained within the specified ranges for the total period required for expulsion of 3 molecules of water of crystallization per molecule of sodium perborate from the original sodium perborate tetrahydrate particles to convert them to sodium monohydrate particles.

5. A process as defined in claim 1 in which the relative humidity of the hot moist air is initially maintained at a level below 40% for a period sufficient to expel between at least 1.5 and at most 2.5 molecules of water of crystallization per molecule of sodium perborate from the original sodium perborate tetrahydrate particles and subsequently maintaining the relative humidity of the hot moist air within the range between 40 and 80% and the temperature of the hot moist air leaving the drying chamber within the range between 70° and 90°C for the period that is required to expel the remainder of the 3 molecules of water of crystallization per molecule of sodium perborate from the original sodium perborate tetrahydrate particles to convert them to sodium perborate monohydrate particles.

* * * * *

UNITED STATES PATENT AND TRADEMARK OFFICE
CERTIFICATE OF CORRECTION

PATENT NO. : 3,914,380
DATED : October 21, 1975
INVENTOR(S) : Helmut Dillenburg, Helmut Honig and Paul-Wilhelm Fuchs It is certified that error appears in the above-identified patent and that said Letters Patent are hereby corrected as shown below:

In the heading [73], the address of the assignee should read -- Höllriegelskreuth, Federal Republic of Germany --.

Signed and Sealed this

Twenty-second Day of March 1977

[SEAL]

Attest:

RUTH C. MASON
*Attesting Officer*

C. MARSHALL DANN
*Commissioner of Patents and Trademarks*